United States Patent [19]

Conover et al.

[11] 4,196,358
[45] Apr. 1, 1980

[54] ANALOG MULTIPLEXER

[75] Inventors: John C. Conover, Sunnyvale; Larry J. Kendall, San Jose, both of Calif.

[73] Assignee: Fairchild Camera & Instrument Corporation, Mountain View, Calif.

[21] Appl. No.: 825,020

[22] Filed: Aug. 16, 1977

[51] Int. Cl.² .................................................. H03K 17/00
[52] U.S. Cl. .................................... 307/243; 307/254; 370/53
[58] Field of Search ............................... 307/243, 254; 340/147 C; 179/15 A; 178/50, 71; 328/104

[56] References Cited
U.S. PATENT DOCUMENTS

| | | | |
|---|---|---|---|
| 3,639,781 | 2/1972 | Marley | 307/243 |
| 3,801,748 | 4/1974 | Cotten, Jr. | 179/15 A |
| 3,904,977 | 9/1975 | Barsotti | 307/243 |
| 4,037,118 | 7/1977 | Sieborger et al. | 307/243 |

Primary Examiner—Stanley D. Miller, Jr.
Assistant Examiner—B. P. Davis
Attorney, Agent, or Firm—Alan H. MacPherson; Robert C. Colwell; Paul J. Winters

[57] ABSTRACT

An analog multiplexer connected to a plurality of input terminals selectively samples the input terminals in response to signals from a controller. The multiplexer includes a sample and ramp amplifier circuit for supplying the selected analog input to desired subsequent circuitry, for example, an analog-to-digital converter. The analog multiplexer is particularly useful in applications wherein a microprocessor periodically senses selected analog sensors and applies signals to control devices to regulate the conditions being sensed.

13 Claims, 3 Drawing Figures

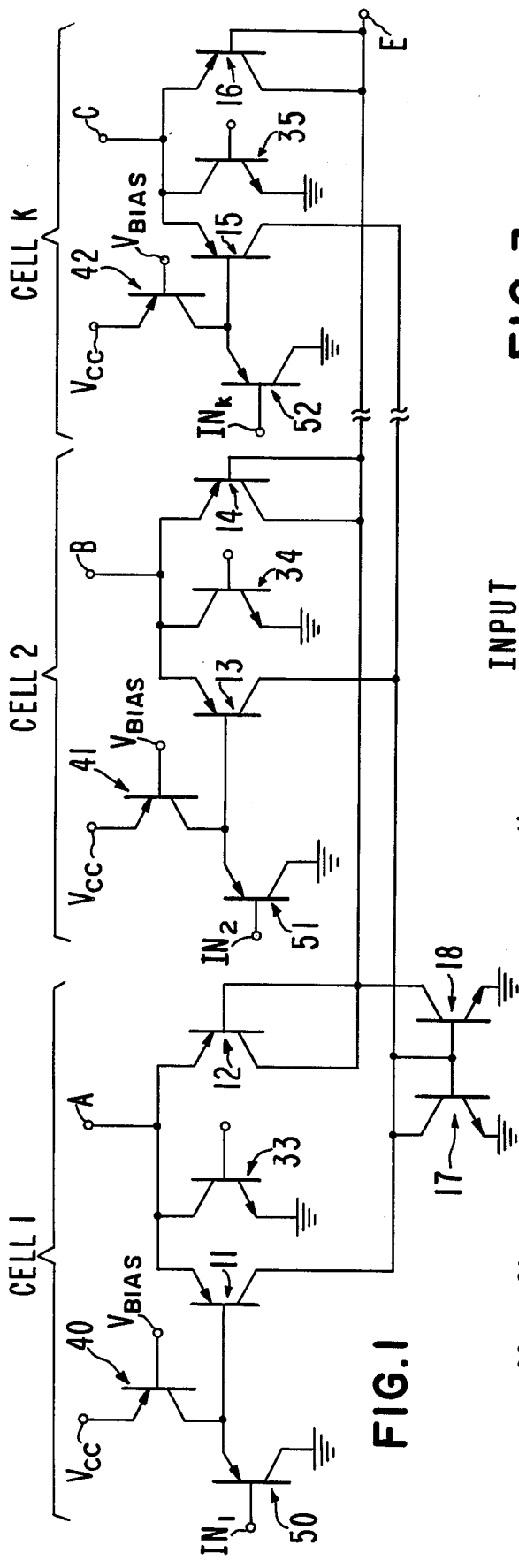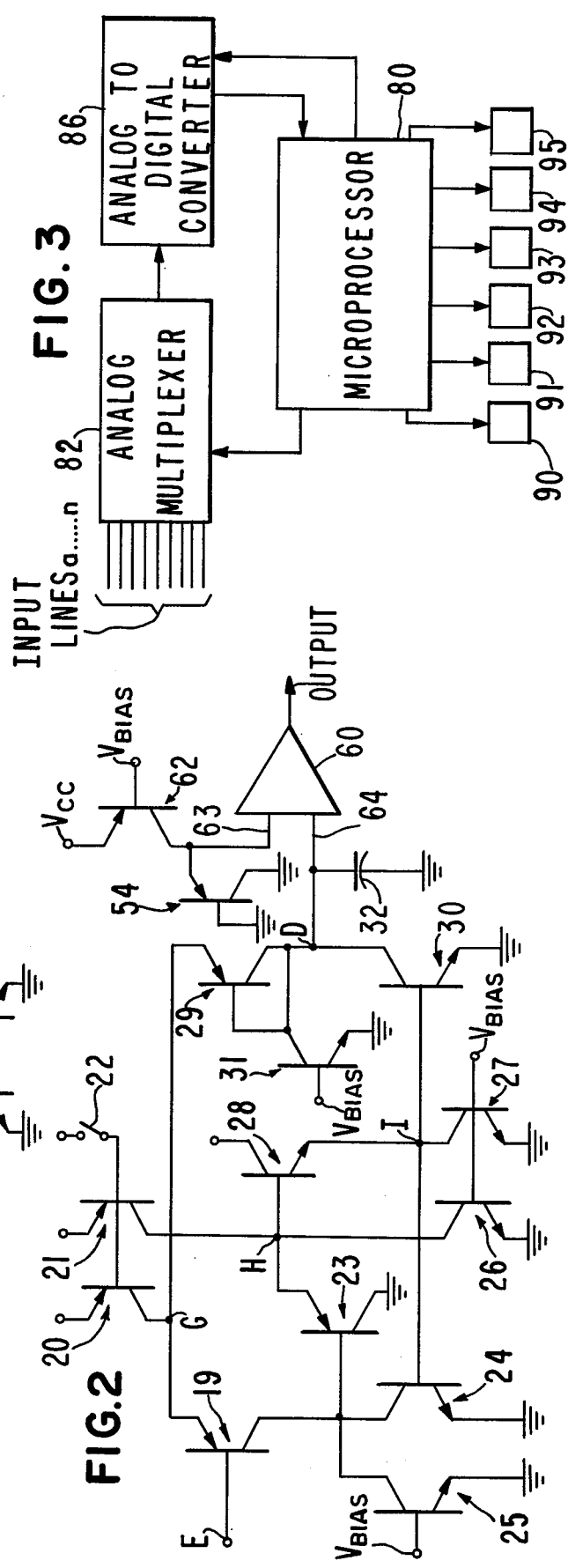

ANALOG MULTIPLEXER

BACKGROUND OF THE INVENTION

1. Field of the Invention

This invention relates to analog multiplexing circuits, and in particular to an analog multiplexing circuit which includes a plurality of input cells, a sampling circuit, and a ramp amplifier circuit.

2. Prior Art

Multiplexing circuits are well known in the prior art and have generally been characterized as either time-division multiplexing circuits or frequency-division multiplexing circuits. The present invention relates to a time-division multiplexing circuit utilized to periodically sample the input signals supplied to a series of input terminals on a multiplexer. Time-division multiplexing circuits utilize the principle of time sharing among the various measurement channels. Sample and hold circuits are utilized whenever it is desirable to make a measurement of a signal and know precisely when the input signal corresponds to the result of the measurement. Sample and hold circuits are also useful in increasing the duration of a signal being measured or otherwise acted upon.

Most prior-art multiplexing circuits are current multiplexers in which the selected input is connected to the common output line through a low impedance, typically a resistance on the order of 1 to 1000 ohms. In these multiplexers, a low impedance is desirable because it allows faster charging of the output load circuit and provides a net lower impedance to the output load. This type of multiplexer has the disadvantage that the input terminals are disconnected at all times except when a single input is selected. The selection process inevitably changes the load on the particular channel and may inject transient signals which distort the signal supplied at the input terminal.

Another disadvantage of many prior-art multiplexing circuits is alternating current or direct current feedthrough from unselected channels to the selected channels. This causes undesirable errors in the output signal, particularly when it is loaded with a high impedance. A further disadvantage of some prior-art circuits occurs when a nonselected input signal exceeds a limited range, particularly if the signal exceeds the power supplied to the multiplexing circuit. This condition can connect unselected input terminals to the single output and to the selected input terminal, causing errors or other undesirable effects.

One prior-art multiplexing circuit is the Harris Semiconductor product HA-2400/2404/2405.

SUMMARY OF THE INVENTION

This analog multiplexer includes a plurality of cells, each cell connected to receive a signal from a single analog input terminal. Each cell comprises a pair of transistors and a switch. The base of one of the transistors is connected to receive the input signals, and the current flowing through the pair of transistors is steered to a current mirror, which is common to all cells. The current mirror allows the output of the multiplexer to assume the potential applied to the input of the selected cell.

The analog multiplexer also includes a sample and ramp amplifier. The ramp amplifier is a switched voltage follower which, during sampling periods, is active to force the voltage on the capacitor to be equal to the input voltage.

The multiplexer buffers each input terminal in a manner which causes each terminal to be subjected to a constant load isolated from the load of adjacent terminals or channels. Further, the invention reduces signal feedthrough by using two levels of isolation and by switching an intermedaite point in the signal path of the nonselected channels to ground, thereby eliminating any effect of any signals present on nonselected input terminals. The multiplexer permits signals at nonselected input terminals to exceed the voltage of the power supply used, limiting these nonselected input terminal voltages only by the breakdown of the input transistor. If an input signal exceeds the negative power supply, the signal is clamped. Thus, signals at a nonselected input terminal will not affect the output signal and are not fed back to any selected input terminal or any other portion of the circuit.

DESCRIPTION OF THE DRAWINGS

FIG. 1 is a circuit schematic of three cells of one embodiment of an analog multiplexer and includes a current mirror.

FIG. 2 is a circuit schematic of the sample and ramp amplifier circuit of the analog multiplexer.

FIG. 3 is a block diagram showing one application of the analog multiplexer utilized in conjunction with a microprocessor for sensing a plurality of inputs and controlling a plurality of devices in response to the information sensed.

DETAILED DESCRIPTION

A portion of the detailed circuit schematic of one embodiment of the analog multiplexer of this invention is shown in FIG. 1. Although only three cells of the analog multiplexer are depicted, any number k of cells may be utilized, where k is an integer. The number k of cells so utilized will depend upon the particular application of the analog multiplexer. Each cell, for example, cell number 1, includes an input terminal $IN_1$, two multiplexing transistors 11 and 12, a current source such as transistor 40, and a switching element, for example, transistor 33. A current source is also supplied to node A, and, in some embodiments, an off-set voltage source, for example, transistor 50, may also be included.

In operation, in response to signals from a control device, for example, a microprocessor, controller, or other means, all of the switches 33, 34, 35 in the series of k cells will be closed except for the switch corresponding to the selected input, which will be open. For example, assume that in response to signals from a microprocessor, input terminal $IN_2$ has been selected as the input to be supplied to circuitry external to the multiplexing circuit, for example, an analog-to-digital converter. Switch 34 therefore will be opened by the controller to allow the input signal at terminal $IN_2$ to be supplied to terminal E in the manner explained below.

In all of the nonselected cells, that is, the cells whose input signals are not desired at terminal E, the respective switches 33 and 35 will be closed to cause the current supplied to node A and node C to sink directly to ground. Therefore, in these nonselected cells, no current will flow through transistors 11, 12, 15 and 16.

In the selected cell, cell 2 in this example, current flowing from terminal B will be equally divided between transistor 13 and transistor 14. The current through transistors 13 and 14, in turn, will be steered to the common current mirror comprised of transistors 17 and 18 to thereby allow the output terminal E to assume the input potential supplied at terminal $IN_2$.

In some embodiments the output signal appearing at node E will be supplied directly to some other circuitry which operates upon this output signal in whatever manner is desired. In other embodiments, however, it is desirable to couple this output signal directly to additional circuitry of the multiplexer as shown in FIG. 2. FIG. 2 is a schematic of the sample and ramp amplifier circuits of the analog multiplexer. The circuit shown in FIG. 2 operates in the following manner. The output terminal E of the circuit of FIG. 1 is coupled to the input terminal E of FIG. 2. Switch 22 is normally open and therefore current is supplied to node G. When the input signal appears at terminal E in FIG. 2, transistor 19 will become less conductive and transistor 29 more conductive. This will cause the potential at node D to approach the potential of node E. As the potential at node D approaches the potential at node E, current from $V_{CC}$ going to transistors 19 and 29 will balance so that equal amounts of current will be flowing from node G toward transistor 29 and from node G toward transistor 19. In a well known fashion this is accomplished by transistors 23, 24, 28 and 30, which function as a current mirror similar to transistors 17 and 18 in FIG. 1.

Once the potentials at node D and E are equal, node E may be disconnectd from node D by closing switch 22. This causes transistors 20 and 21 to turn off, which turns off transistors 19 and 29. Transistors 26 and 27 become saturated, thereby causing nodes H and I to go to very nearly ground potential. Transistors 24 and 30 are also turned off. The potential at node E then may be altered without affecting the potential at node D.

In some embodiments of the multiplexing circuit, transistors 25 and 31 are provided to generate a ramp signal. Transistor 31 causes the potential of node D to decrease at a linear rate, depending upon the capacitance of capacitor 32 and the current flowing through transistor 31. Transistor 25 causes transistors 19 and 29 to have equal currents when the potentials of node D and node E are equal. Because the ramp signal provides a time conversion equivalent to the potential at node E, the ramp signal may be useful in digital circuits connected to the circuit shown in FIG. 2. Typically, the ramp signal will be supplied to a comparator 60. Comparator 60 will compare the ramp signal at terminal 64 with the signal present at terminal 63.

The time required for the ramp voltage to decrease to the comparison voltage, that is, the potential of terminal 63, will be proportional to the difference between the potential of the selected input and the comparison voltage. This time may be measured in a circuit such as shown in FIG. 3 to derive a digital equivalent of the input voltage.

In still further embodiments of the analog multiplexer of this invention, an off-set voltage is applied to the comparator by transistor 54 and applied to the input terminals $IN_1$, $IN_2$, $IN_k$ of the multiplexer shown in FIG. 1, to increase the dynamic range of the analog multiplexer.

Transistors 50, 51, 52 will maintain nodes A, B and C at least two $V_{BE}$ above ground potential to thereby prevent the saturation of transitors 11, 12, 13, 14, 15 and 16. Transistor 54 provides a compensating shift for comparator 60 and allows transistor 31 to operate in a linear range.

FIG. 3 is a block diagram showing one application of the analog multiplexer of this invention utilized in conjunction with a microprocessor for sensing a plurality of input and controlling a plurality of devices in response to the information sent. As shown in FIG. 3, analog multiplexer 82 is connected to receive a plurality of input signals on lines a . . . n. Typically, the input will be representative of the behavior of some type of system. The system, in turn, may be controlled by a group of devices, for example, devices 90, 91, 92, 93, 94 and 95. The output from multiplexer 82 is supplied to an analog-to-digital converter 86, which in turn supplies the information to a microprocessor 80. In response to the input signals from A-to-D converter 86, microprocessor 80 will regulate or control devices 90 through 95 and will control which of the inputs to multiplexer 82 is supplied to A-to-D converter 86. Microprocessor 80 will typically be programmed with information representative of the relationship between the input signal supplied to multiplexer 82 and the output signal supplied to the controlled devices 90 through 95. For example, if one of the input signals to multiplexer 82 is temperature information, then microprocessor 80 will have been programmed to control temperature in the manner desired, by appropriate signals to one of the control devices 90 through 95.

What is claimed is:

1. A multiplexing circuit comprising:
    a first conducting line,
    a second conducting line,
    a plurality of input cells, each cell having:
        an input terminal connected to receive electrical signals,
        a first transistor connected to the input terminal, to a node and to the second line,
        a second transistor connected between the node and the first line, and
        means for supplying electrical current to the node during selected periods, said means including a current supply connected to the node and a switch connected between the node and ground;
    an output terminal connected to the first line; and
    wherein the switches of all but one of the plurality of input cells are closed at any given time to thereby allow the electrical signals supplied to the input terminal of the cell having an open switch to be supplied to the output terminal connected to the first line.

2. A multiplexing circuit as in claim 1 including means for causing the potential of the output terminal to be equal to the potential of the electrical signals supplied to any of the plurality of input terminals during the selected periods.

3. A multiplexing circuit as in claim 1 wherein the switch is a transistor.

4. A multiplexing circuit as in claim 3 wherein the means for causing the potential of the output terminal to be equal to the potential of the electrical signals supplied to the input terminal comprises a current mirror.

5. A multiplexing circuit as in claim 4 wherein the current mirror comprises a third transistor connected to the second line and a fourth transistor connected between the third transistor and the first line.

6. A multiplexing circuit as in claim 5 wherein each of the first, second, third and fourth transistors are bipolar transistors.

7. A multiplexing circuit as in claim 6 wherein:

the collector and the base of the third transistor are connected to the second line and to the base of the fourth transistor;

the collector of the fourth transistor is connected to the first line; and the emitters of the third and fourth transistors are connected to ground.

8. A multiplexing circuit as in claim 1 wherein:

the base of the first transistor is connected to the input terminal, the emitter of the first transistor is connected to the node, and the collector of the first transistor is connected to the second line, and the emitter of the second transistor is connected to the node, and the base and collector of the second transistor are connected to the first line.

9. A multiplexing circuit as in claim 8 wherein the base of an offset transistor is connected to the input terminal, the emitter of the offset transistor is connectd to the base of the first transistor and the collector of the offset transistor is connected to ground.

10. A multiplexing circuit as in claim 5 wherein:

the output terminal is connected to a fifth transistor, a sixth transistor is connected to the fifth transistor, a capacitor is connected to the sixth transistor, and a second output terminal is connected to the sixth transistor.

11. A multiplexing circuit as in claim 10 wherein:

the output terminal is connected to the base of the fifth transistor, the emitter of the sixth transistor is connected to the emitter of the fifth transistor, the capacitor is connected to the collector of the sixth transistor, and the second output terminal is connected to the base of the sixth transistor.

12. A multiplexing circuit as in claim 11 wherein:

the collector of the seventh transistor is connected to the emitters of the fifth and sixth transistors, the emitter of the seventh transistor is connected to a current supply, and the base of the seventh transistor is connected through a ramp switch to a current supply.

13. A multiplexing circuit as in claim 12 wherein:

the collector of the fifth transistor is connected to the collector of an eighth transistor, the collector of the sixth transistor is connected to the collector of a ninth transistor, p1 the bases of the eighth and ninth transistors are connected togehter, and the emitters of the eighth and ninth transistors are connected to ground.

* * * * *

Disclaimer 4,196,358.—*John C. Conover*, Sunnyvale and *Larry J. Kendall*, San Jose, Calif. ANALOG MULTIPLEXER. Patent dated Apr. 1, 1980. Disclaimer filed June 14, 1982, by the assignee, *Fairchild Camera and Instrument Corp.*

Hereby enters this disclaimer to all claims of said patent.

[*Official Gazette September 21, 1982.*]